No. 861,268. PATENTED JULY 30, 1907.

G. CORADI.
PLANIMETER FOR MEASURING THE AREAS OF LEATHER, HIDES, &c.
APPLICATION FILED FEB. 16, 1907.

Witnesses:

Inventor:
Gottlieb Coradi
by Henry Orth
Atty.

THE NORRIS PETERS CO., WASHINGTON, D. C.

UNITED STATES PATENT OFFICE.

GOTTLIEB CORADI, OF ZURICH, SWITZERLAND.

PLANIMETER FOR MEASURING THE AREAS OF LEATHER, HIDES, &c.

No. 861,268.   Specification of Letters Patent.   Patented July 30, 1907.

Application filed February 16, 1907. Serial No. 357,735.

*To all whom it may concern:*

Be it known that I, GOTTLIEB CORADI, a citizen of the Republic of Switzerland, residing at Zurich, Switzerland, have invented certain new and useful Improvements in or Relating to Planimeters for Measuring the Areas of Leather, Hides, and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to planimeters and has for its object to provide an instrument for determining the superficial area of irregularly-shaped bodies such as hides and the like, and to indicate the superficial area simultaneously in two different units of measurement for instance, square decimeter and square foot.

Figure 3:
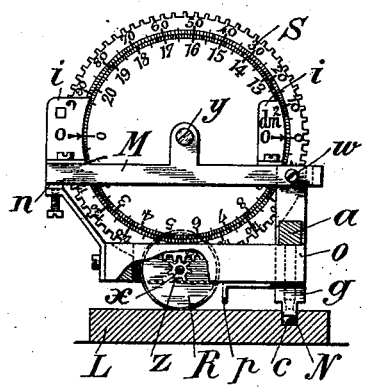
Figure 1:
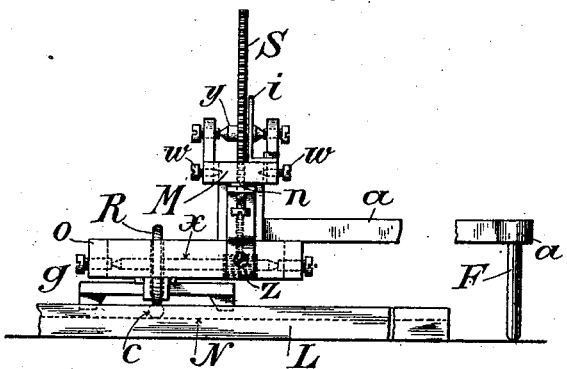
Figure 2:
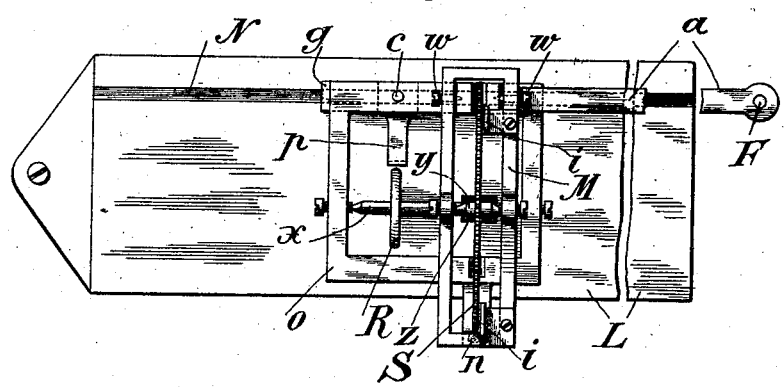
Figure 4:
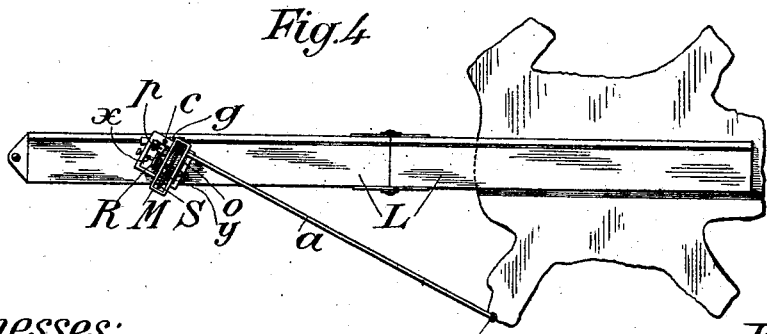

In the accompanying drawings: Figure 1 is a front view of an instrument embodying my invention. Fig. 2, a plan view: Fig. 3, a side view of the same: and Fig. 4, a diagrammatic view as a whole.

The instrument is provided with a straight rule L, which is laid on the body to be measured and on which the instrument is mounted. The instrument comprises a rectangular frame $o$ pivotally connected at one side to a guide plate $g$ by means of a vertical pin $c$ adapted to slide in a longitudinal slot N formed in the rule. The plate $g$ is held in alinement with the slot by means of depending lugs formed thereon, which project into the slot. The pin $c$ serves as a pivot for a tracer arm $a$ mounted on and extending beyond the frame $o$ and on the latter is an arm $p$ extending at right angles to the arm $a$, adapted to engage the guide plate and limit the angular movement of the tracer arm to an angle of 75° on each side of the groove N.

A measuring roller R is mounted on an axle $x$ journaled in the frame $o$ and rests on the ruler. The plane of the roller passes through the axis of pivot $c$ and is at right angles to the arm $a$.

A tracer pin F is mounted in the free end of the arm $a$ with which the outline of the body to be measured is traced in the direction of the movement of the hands of a watch commencing at a point in proximity to the rule L and again returning to the same. During this movement of the tracer pin, the axis $c$ will slide in the groove N of the rule. The measuring roller R resting on the wood rule will partly slide and partly turn on its axis and when the tracer pin F has returned to its initial point, it will have described a number of turning movements proportionate to the area traveled over by the tracer pin. In all planimeters which after a single tracing indicate in a single unit of measurement the superficial area, the measuring roller is provided with a graduated circle divided into one hundred intervals, and the axis of the measuring roller gears by means of an endless screw with a toothed wheel, the axis of which is provided with a counting wheel, on which the entire revolutions which the measuring roller R executes are counted. As the periphery of the measuring roller can only present a unit for one scale of measurement, for instance, only one square foot or only ten square decimeters, this arrangement cannot be employed for simultaneously ascertaining the superficial area in two units of measurement, because the decimal graduation of the measuring roller and of the counting wheel cannot be carried out. In order to attain this object the counting wheel must be arranged as a correctly functioning measuring disk and be so arranged with two graduations for the desired scale of measurement, that in the largest area to be measured this wheel only makes one revolution and the intervals are as large as the prescribed exactness requires.

The connection hitherto customary of the counting wheel with the axis of the measuring roller by means of an endless screw cannot be employed for the present object, because in this method of transfer the counting wheel at each revolution of the measuring roller only moves forward to the extent of one tooth and thus the interval is too small to allow of sufficiently small parts of a measuring roller revolution, *i. e.* sufficiently exactly, being read off. However, even if a small toothed wheel and a large counting disk were employed so that the intervals would be sufficiently large, no sufficiently exact recording would be attained, because the play which the toothed wheel must have in the worm gear, in order not to impede the correct travel of the measuring roller, would be much too great. Now the construction shown in the accompanying drawings seeks to fulfil the object sought after.

The axis $y$ of the measuring disk S is horizontal and located parallel over the axis $x$ of the measuring roller R. The latter has on the right hand side a toothed pinion $z$ gearing with the toothed periphery of the measuring disk.

The frame M in which the axis $y$ of the measuring disk S is located rests in points $w$ and is capable of being raised and lowered thereon. This is done by hand in order to disengage the toothed periphery of the measuring disk S from the pinion $z$ of the measuring roller R, thereby obtaining a rapid adjustment of the measuring disk S to zero. The falling of the frame M takes place automatically by its own weight and is limited by the stop $n$, which is so regulated that the engagement of the toothed periphery of the measuring disk S takes place without any pressure on the measuring roller axis in order to avoid any checking of the free movement of the latter. The remaining play in the teeth is so small that it is immaterial as regards the reading off.

The diameters of the pinion $z$ on the measuring roller axis $x$ and of the measuring disk S are so selected that the latter makes a complete revolution when the measuring roller R has made 20 revolutions. If a revolution of the measuring roller R corresponds to, for instance, 10 square decimeters, the disk S would be divided into 200 parts, and one part of the same would correspond to one square decimeter. If the wheel S be provided with a second scale in 215 parts, such a part corresponds to the tenth of an English square foot, therefore $\frac{1}{10}$ of a square foot or one square decimeter can be read off directly and smaller sub-divisions may be estimated with certainty.

The indices or pointers $i$ for the two scales are placed opposite one another (180°) and so formed that they cover each time the non-used scale and so prevent mistakes.

Having now particularly described and ascertained the nature of the said invention and in what manner the same is to be performed, I declare that what I claim is:

1. In combination with a planimeter for measuring areas of leather hides, a rule having a longitudinal groove, a tracing arm the axis of rotation of which is guided in said groove, a measuring roller resting on said rule, a support frame for the horizontal axis of said measuring roller, and a stop on the bearing frame so arranged that the tracing arm can at the most only oscillate 75° to the right and left of the rule, substantially as described and shown.

2. In combination, in a planimeter for measuring areas of leather hides, a rule having a longitudinal groove, a tracing arm the axis of rotation of which is guided in said groove, a measuring roller resting on said rule, a bearing frame for the horizontal axis of said measuring roller, a stop so arranged on the bearing frame that the tracing arm can at the most only oscillate 75° to right and left of the rule, a pinion mounted on the axis of the measuring roller, and a measuring disk toothed on its periphery engaging with said pinion and provided with scales for two units of measurement, substantially as described and shown.

3. In combination, in a planimeter for measuring areas of leather hides, a rule having a longitudinal groove, a tracing arm, the axis of rotation of which is guided in said groove, a measuring roller resting on said rule, a bearing frame for the horizontal axis of said measuring roller, a stop on the bearing frame so arranged that the tracing arm can only at the most oscillate 75° to right and left of said rule, a pinion mounted on the axis of said measuring roller, a measuring disk toothed on its periphery gearing with said pinion and provided with scales for two units of measurement, and two indices on said counting wheel opposite one another, each index covering a scale, substantially as described and shown.

4. In combination, in a planimeter for measuring areas of leather hides, a rule having a longitudinal groove, a tracing arm the axis of rotation of which is guided in said groove, a measuring roller resting on said rule, a bearing frame for the horizontal axis of said measuring roller, a stop on the bearing frame so arranged that the tracing arm can at the most only oscillate about 75° to right and left of the rule, a pinion mounted on the axis of said measuring roller, and a measuring disk toothed on its periphery gearing with the pinion, and provided with scales for two units of measurement, and a tilting frame pivotally mounted at one of its ends, in which the horizontal axis of the measuring disk is mounted, substantially as described and shown.

5. In combination in a planimeter for measuring areas of leather, a rule having a longitudinal groove, a tracing arm the axis of rotation of which is located in said groove, a measuring roller resting on said rule, a bearing frame for the horizontal axis of said measuring roller, a stop on the bearing frame so arranged that the tracing arm can only at the most oscillate about 75° to right and left of the rule, a pinion mounted on the axis of said measuring roller, a measuring disk toothed on its periphery gearing with the pinion and provided with scales for two units of measurement, a tilting frame pivotally mounted on one of its ends, in which frame the horizontal axis of the measuring disk is located and means for adjusting the position of the tilting frame, substantially as described and shown.

6. In combination, a tracing arm, a guide for the axis of said arm, a measuring roller, a frame for the latter connected to the tracing arm and means adapted to engage the guide to limit the angular movement of the tracing arm.

7. In a planimeter, a tracing arm, a guide for the axis of said arm, a frame connected to the latter, a measuring roller mounted on an axle journaled in the frame parallel to the tracing arm, an arm on the frame adapted to limit the angular movement of the tracing arm.

8. In a planimeter, the combination with a rule having a longitudinal groove therein, of a pin movably mounted in the groove, a frame pivoted on the pin, a tracing arm mounted on the frame, a measuring roller resting on the rule mounted on an axle journaled in the frame parallel to the tracing arm, and a stop mounted at right angles to the latter adapted to limit the angular movement of the tracer arm.

9. In a planimeter, a measuring wheel, a pinion carried thereby, a pivotally mounted frame and a measuring disk mounted in the latter in gear with the pinion.

10. In a planimeter, a measuring wheel, a frame supported by said wheel, a pinion fixed to rotate with the wheel, a frame pivotally mounted on the aforesaid frame, and a measuring disk rotatably mounted in the pivoted frame having a toothed periphery in gear with the pinion.

In testimony that I claim the foregoing as my invention, I have signed my name in presence of two subscribing witnesses.

GOTTLIEB CORADI.

Witnesses:
EMIL BLUM,
JOSEPH SIMON.